Nov. 21, 1944.  W. R. HARDING ET AL  2,363,321
MOTOR CONTROL SYSTEM
Filed June 19, 1942
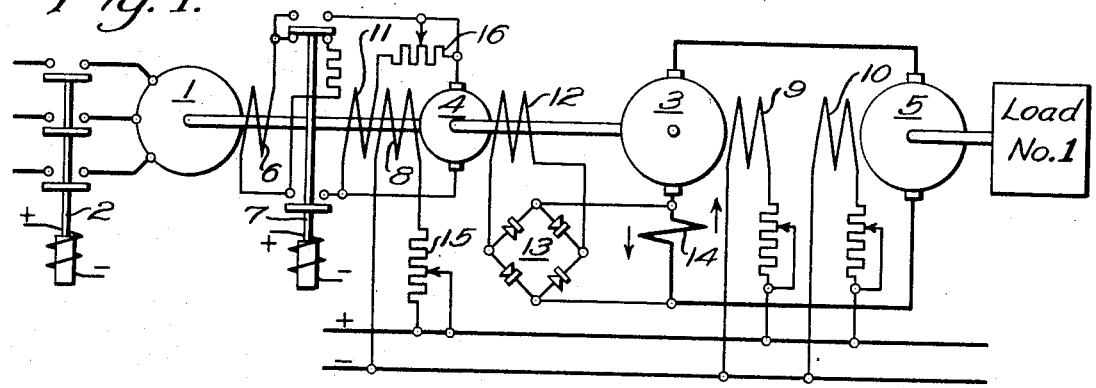
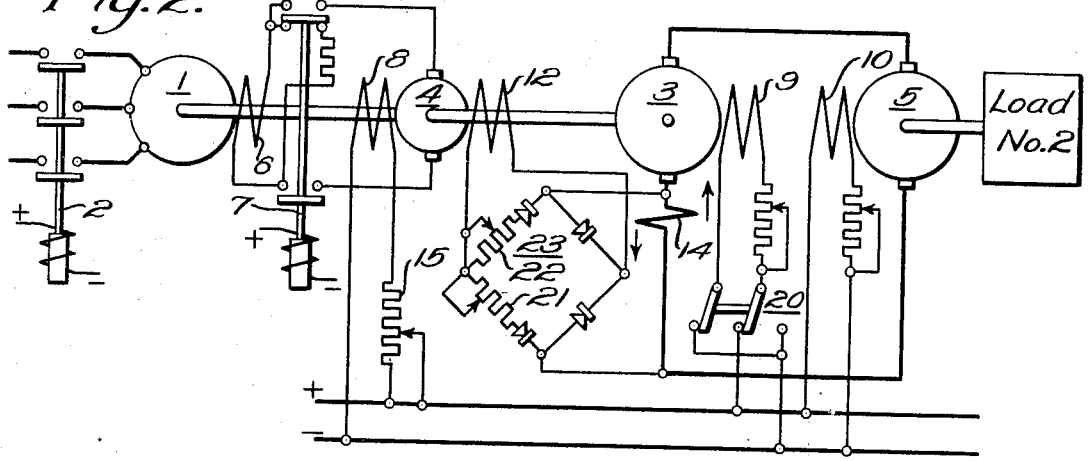
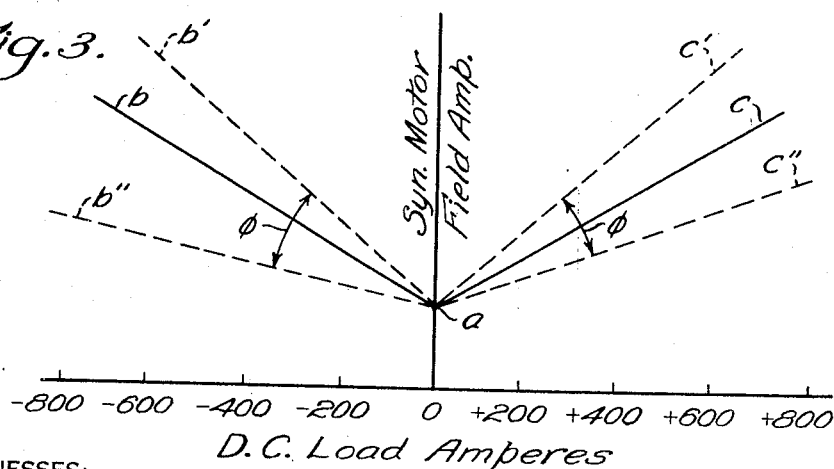
WITNESSES:
Robert C. Baird
INVENTORS.
William R. Harding and
Scott H. Hanville, Jr.
BY Paul E. Friedemann
ATTORNEY Patented Nov. 21, 1944

2,363,321

UNITED STATES PATENT OFFICE 2,363,321

MOTOR CONTROL SYSTEM

William R. Harding, Export, Pa., and Scott H. Hanville, Jr., Huron, Ohio, assignors to Westinghouse Electric & Manufacturing Company, East Pittsburgh, Pa., a corporation of Pennsylvania Application June 19, 1942, Serial No. 447,688

5 Claims. (Cl. 172—239)

Our invention relates to a system of control for a dynamo-electric machine and, more particularly, to a system of control for automatically increasing the direct-current excitation above a given value of a dynamo-electric machine, as a function of the absolute value of current in an electric circuit.

One object of our invention is to increase, from a given value, the direct-current excitation of a dynamo-electric machine, as an alternator, or a synchronous motor, a direct current generator or motor, or other machine, as a function of the magnitude of the absolute change of current from zero in an electric circuit.

Another object of our invention is to increase the direct-current excitation of a synchronous motor above a given value in proportion to the variations of load current, from zero in either direction, of two dynamo-electric machines of near the same capacity electrically connected to each other, wherein one of said machines is coupled to be normally mechanically driven by the synchronous motor.

In certain substations, particularly for electric railway applications, synchronous motors are used in the substation to drive generators for generating the energy used by the train motors. As the train goes upgrade, a considerable load is placed on the synchronous motor, and to supply this added load, the field excitation of the synchronous motor has to be increased.

As soon as the train is at the top of the mountain, it begins to descend and the train motors begin to regenerate. To thus take advantage of this regeneration by making certain that the synchronous motor, driven as an alternator from the substation generator, pumps energy back into the system, the excitation should again increase as a function of the now reverse current of the train motors.

The broad requirements of the two paragraphs just preceding have been accomplished by clumsy, complicated, expensive, and inefficient prior art devices. With our systems of control, we accomplish these and other results with much less equipment and with equipment that is more efficient, simpler, more reliable, cheaper, and in addition has the advantage of being susceptible of more general application. Our control schemes having general application find a greater field of use than for electric railway application in a mountainous terrain.

From the foregoing, it will be apparent that the objects specifically recited are merely illustrative, and that other objects of our invention will become more apparent from a study of the following specification and the accompanying drawing, in which:

Figure 1 is a diagrammatic showing of one application of our invention;

Fig. 2 is a diagrammatic showing of another application of our invention; and

Fig. 3 shows some curves of value in describing the operation of our invention.

In Fig. 1, 1 represents a synchronous motor which may be connected to a suitable source of alternating current by circuit breaker 2. This synchronous motor drives a main generator 3 and an exciter 4. The generator 3 is connected in a loop circuit to a motor 5 operating a suitable load, designated Load No. 1, as a train.

The synchronous motor 1 may be of conventional design, but preferably is of a design to also operate with efficiency as an alternator. This synchronous motor has the field winding 6 disposed to be connected to the exciter 4 by means of the field switch 7. The exciter 4, the generator 3 and the motor 5 have the field windings 8, 9 and 10, respectively. These field windings are connected to a suitable source of direct current.

In operation, switches 2 and 7 are closed and the field excitation of field winding 8 is so adjusted to give a no-load excitation to the field winding 6 of the value $a$ as shown in Fig. 3. We show a shunt field winding 11 for the exciter 4, but it is not an essential feature of our control. With the prior art control systems, discussed somewhat more in detail hereinafter, field 11 is essential. With our system of control, field 11 merely has a small somewhat helpful stabilizing effect.

The exciter has a second field (disregarding field 11) 12 connected in the bridge circuit of a full-wave rectifier 13, which has its input terminals connected across the interpole winding 14 of the generator 3.

Assuming the train is running along a portion of track requiring no load, the current in the loop circuit will thus be zero, and the excitation current in field winding 12 of exciter 4 will be zero. The synchronous motor excitation will thus be at value $a$, Fig. 3.

As the grade gradually changes from this no-load grade to a steep upgrade, the load current of the motor 5 rises. As this current rises, the voltage drop across the interpole winding rises, as indicated by the arrow at the right of field 14. The current in field winding 12 thus rises as a direct function of the rise in drop across the interpole winding. Since the winding 12 is wound cumulatively with respect to field winding 8, the synchronous motor field excitation rises along curve *ac*. The slope and other characteristics of this curve are determined by design constants and the adjustment of rheostats 15 and 16.

After the train is at the top of the mountain and begins to descend, the motor, or motors, 5 becomes a generator, and the current in the loop circuit of machines 3 and 5 and thus in field winding 14 reverses. This is shown by the arrow at the left of the interpole field 14. The current, by reason of the rectifier 13, in field winding 12 again rises with the result that the synchronous motor excitation, now driven as a generator, rises along curve *ab*.

With a well-known prior art scheme, this result is accomplished by the use of an exciter having two field windings like 11 and 12, and then use is made of two additional so-called series field windings. These so-called series field windings of the exciter are in series with the loop circuit of machines 3 and 5. One series field winding has a small number of turns, usually one turn, and the other has twice as many turns, that is, two turns. The one-turn winding is wound cumulatively with the winding corresponding to winding 8 of our control for one direction of load current, and the two-turn winding is wound cumulative with the winding corresponding to winding 8 of our control for the opposite direction of load current.

A reverse current relay responsive to the direction of the current in the loop circuit is used to control a contactor for shunting the two-turn series field winding when the current in the loop circuit is in said one direction. In this prior art scheme, the field winding corresponding to 11 is an essential part, since it is used to control the amplifying effect of the so-called series field windings.

Since both series field windings have to carry the main line current, the turns have to be few, and large copper straps are necessary. The normal size of exciter relative its corresponding size of synchronous motor is usually too small to receive the large straps, and a larger exciter than necessary has to be selected.

Further, the contactor for shunting the two-turn series winding has to be a very large one to carry the full line current. The cost and size of this contactor alone approach that of the exciter.

The operation of such prior art scheme is briefly this: When the substation is delivering power, the one-turn series field is excited in varying degrees depending upon the station load, and the two-turn series field is shunted by the large contactor set in operation by the mentioned reverse current relay. When the substation is regenerating, the current in both series fields reverses, but the large contactor is also opened and the magnetic effect of the series fields is in opposition. The two-turn field not only cancels the effect of the one-turn field, but further provides a one-turn effect in the opposite direction, namely, the same direction as for the loaded substation.

From the foregoing, it will be apparent in our scheme that: The exciter can be of the smallest rating consistent with proper excitation of the synchronous motor; The exciter need have only two fields, 8 and 12, of conventional design characteristics; No reverse current relay is needed; And no large and expensive contactor, which also presents a serious maintenance problem, is needed.

In Fig. 2, we have designated, with the same reference characters, all the elements that correspond in structure and function with those shown in Fig. 1. Their description need, therefore, not be repeated.

Our scheme of control being, among other features, so much simpler, cheaper, and more reliable than prior art devices has general application. In Fig. 2, Load No. 2 may represent a planer platen, or may represent the reversing table in a steel mill, or may represent any other load where load operation and regenerating operation may alternate. Usually for such applications machine 1 would be a direct current motor.

In this modification, the field for machine 3 is shown with a reversing control simply indicated by switch 20. Each time the reversing table of a steel mill is reversed by operation of switch 20, there is a regenerating period. With our scheme, this reversing energy is thus recovered. At the end of the other stroke, the cycle is repeated and energy is recovered.

In a planer, for instance, the return movement of the platen is rapid, and the regenerative energy at the end of the return stroke may be high. This is particularly true of large planers operating on large and heavy work pieces. The excitation increase required at one end of the stroke may thus be greatly different than at the other. To take care of this contingency, we provide the rheostats 21 and 22 in two adjacent legs of the bridge of the rectifier 23. One rheostat may often suffice, but the use of two makes the control a bit more flexible.

By a suitable selection of the characteristics of the field 12 and the circuits that control it, the maximum excitation increase may be selected to follow curves *ac'* and *ab'*. Then, by suitably adjusting rheostat 21, or 22, or both, the excitation increase during alternate loaded operation and regenerating operation may follow any slope of these curves and in any combination within the respective ranges, as angles $\theta$ and $\phi$, of adjustment of the rheostats 21 and 22.

While we have described but two embodiments of our invention, we do not feel our invention is limited to the specific showing made, but is to be limited only by the scope of the claims hereto appended.

We claim as our invention:

1. In an electric system of control, in combination, a source of alternating-current, a load, an alternating-current dynamo-electric machine disposed to be connected to said source of alternating-current and designed either to operate as a synchronous motor driving said load or as an alternator, driven by the load, to feed electric energy back into the source of alternating-current, said load comprising an exciter and a generator, which generator is designed to also be able to operate as a motor to drive the exciter and dynamo-electric machine as exciter and alternator respectively, a motor electrically connected in a loop circuit with the generator, said motor being designed to also operate as a generator, a mechanical load coupled to the motor, said mechanical load having a load characteristic that varies from a given maximum positive value to a given negative value, a source of direct current, said exciter, generator, and motor each having a field winding connected to the source of direct current, control means for controlling the excitation of these field windings in any desired manner, a full-wave rectifier connected to spaced points of the loop circuit to thus produce a unidirectional output voltage as a direct function of the change in absolute value of the current in the loop circuit, a second field winding on the exciter, acting cumulatively with the first field winding, connected to the output circuit of the rectifier, and a field winding in the dynamo-electric machine connected to the armature terminals of the exciter.

2. In an electric system of control, in combination, a source of supply, a load, a dynamo-electric machine disposed to be connected to said source of supply and designed either to operate as a motor driving said load or as a generator, driven by the load, to feed electric energy back into the source of supply, said load comprising an exciter and a motor driving generator, which last-named generator is designed to also be able to operate as a motor to drive the exciter and dynamo-electric machine as exciter and generator respectively, a motor electrically connected in a loop circuit with the motor driving generator, said motor being designed to also operate as a generator, a mechanical load coupled to the motor, said mechanical load having a load characteristic that varies from a given maximum positive value to a given negative value, a source of direct current, said exciter, motor driving generator, and motor each having a field winding connected to the source of direct current, control means for controlling the excitation of these field windings in any desired manner, said motor driving generator having an interpole winding in series with the loop circuit, a full-wave rectifier connected across the terminals of the interpole winding, a second field winding on the exciter, wound to act cumulatively with the first field winding of the exciter, connected to the direct-current terminals of the rectifier, and a field winding for the dynamo-electric machine connected to the armature terminals of the exciter.

3. In an electric system of control, in combination, a source of supply, a load, a dynamo-electric machine disposed to be connected to said source of supply and designed either to operate as a motor driving said load or as a generator, driven by the load, to feed electric energy back into the source of supply, said load comprising an exciter and a motor driving generator, which last-named generator is designed to also be able to operate as a motor to drive the exciter and dynamo-electric machine as exciter and generator respectively, a motor electrically connected in a loop circuit with the motor driving generator, said motor being designed to also operate as a generator, a mechanical load coupled to the motor, said mechanical load having a load characteristic that varies from a given maximum positive value to a given negative value, a source of direct current, said exciter, motor driving generator, and motor each having a field winding connected to the source of direct current, control means for controlling the excitation of these field windings in any desired manner, said motor driving generator having an interpole winding in series with the loop circuit, a full-wave rectifier connected across the terminals of the interpole winding, a second field winding on the exciter, wound to act cumulatively with the first field winding of the exciter, connected to the direct-current terminals of the rectifier, and a field winding for the dynamo-electric machine connected to the armature terminals of the exciter, and adjustable impedance means interconnected with the rectifier to alter the magnitude of its effect.

4. In an electric system of control, in combination, a source of supply, a load, a dynamo-electric machine disposed to be connected to said source of supply and designed either to operate as a motor driving said load or as a generator, driven by the load, to feed electric energy back into the source of supply, said load comprising an exciter and a motor driving generator, which generator is designed to also be able to operate as a motor to drive the exciter and dynamo-electric machine as exciter and generator respectively, a motor electrically connected in a loop circuit with the motor driving generator, said motor being designed to also operate as a generator, a mechanical load coupled to the motor, said mechanical load having a load characteristic that varies from a given maximum positive value to a given negative value, a source of direct current, said exciter, motor driving generator, and motor each having a field winding connected to the source of direct current, control means for controlling the excitation of these field windings in any desired manner, a full-wave rectifier connected to spaced points on the loop circuit to thus produce a unidirectional output voltage as a direct function of the change in absolute value of the current in the loop circuit, a second field winding on the exciter, acting cumulatively with the first field winding, connected to the output circuit of the rectifier, and a field winding in the dynamo-electric machine connected to the armature terminals of the exciter, and means in the rectifier circuit for altering the proportionality of the said direct function.

5. In an electric system of control, in combination, a source of supply, a load, a dynamo-electric machine disposed to be connected to said source of supply and designed either to operate as a motor driving said load or as a generator, driven by the load, to feed electric energy back into the source of supply, said load comprising an exciter and a motor driving generator, which generator is designed to also be able to operate as to motor to drive the exciter and dynamo-electric machine as exciter and generator respectively, a motor electrically connected in a loop circuit with the motor driving generator, said motor being designed to also operate as a generator, a mechanical load coupled to the motor, said mechanical load having a load characteristic that varies from a given maximum positive value to a given negative value, a source of direct current, said exciter, motor driving generator, and motor each having a field winding connected to the source of direct current, control means for controlling the excitation of these field windings in any desired manner, a full-wave rectifier connected to spaced points on the loop circuit to thus produce a unidirectional output voltage as a direct function of the change in absolute value of the current in the loop circuit, a second field winding on the exciter, acting cumulatively with the first field winding, connected to the output circuit of the rectifier, and a field winding in the dynamo-electric machine connected to the armature terminals of the exciter, and rheostatic means for altering the ratio of the field current in the field winding connected to the output circuit of the rectifier to the absolute value of the current in the loop circuit.

WILLIAM R. HARDING.
SCOTT H. HANVILLE, Jr.